United States Patent [19]

Helling et al.

[11] Patent Number: 5,354,826
[45] Date of Patent: Oct. 11, 1994

[54] POLYMERIC MAGENTA COUPLER AND COLOR PHOTOGRAPHIC RECORDING MATERIAL THAT CONTAINS THIS POLYMERIC MAGENTA COUPLER

[75] Inventors: Günter Helling, Odenthal-Glöbusch; Rainer Bialek; Ralf Weimann, both of Leverkusen, all of Fed. Rep. of Germany

[73] Assignee: Agfa-Gevaert AG, Leverkusen, Fed. Rep. of Germany

[21] Appl. No.: 53,370

[22] Filed: Apr. 28, 1993

[30] Foreign Application Priority Data

May 8, 1992 [DE] Fed. Rep. of Germany ....... 4215206

[51] Int. Cl.$^5$ ............. C08F 26/06; C08F 126/06; C08F 226/06
[52] U.S. Cl. ................... 526/259; 430/548; 430/558; 430/630
[58] Field of Search ............. 430/548, 558, 630; 548/262.4, 360.1, 360.5; 526/259, 258

[56] References Cited

U.S. PATENT DOCUMENTS

| | | | |
|---|---|---|---|
| 4,585,732 | 4/1986 | Kawagishi et al. | 430/558 |
| 4,681,835 | 7/1987 | Ishikawa et al. | 430/386 |
| 4,695,530 | 9/1987 | Nakamura et al. | 430/381 |
| 4,704,350 | 11/1987 | Morigaki et al. | 430/546 |
| 4,764,456 | 8/1988 | Watanabe et al. | 430/550 |
| 4,769,313 | 9/1988 | Fujimoto et al. | 430/393 |
| 4,774,167 | 9/1988 | Koshimizu et al. | 430/380 |
| 4,808,515 | 2/1989 | Morigaki et al. | 430/551 |
| 4,824,772 | 4/1989 | Ichijima et al. | 430/544 |
| 4,851,326 | 7/1989 | Ishikawa et al. | 430/380 |
| 4,865,960 | 9/1989 | Helling et al. | 430/548 |
| 4,914,007 | 4/1990 | Fujita et al. | 430/372 |
| 4,920,042 | 4/1990 | Waki et al. | 430/380 |
| 4,921,782 | 5/1990 | Helling | 430/558 |
| 4,954,426 | 9/1990 | Ishikawa | 430/386 |

FOREIGN PATENT DOCUMENTS

| | | |
|---|---|---|
| 261244 | 3/1988 | European Pat. Off. . |
| 289008 | 11/1988 | European Pat. Off. . |
| 3172837 | 7/1991 | Japan . |

Primary Examiner—Charles L. Bowers, Jr.
Assistant Examiner—Geraldine Letscher
Attorney, Agent, or Firm—Connolly & Hutz

[57] ABSTRACT

Polymeric color couplers with repeating units of a polymerized monomer K of formula I

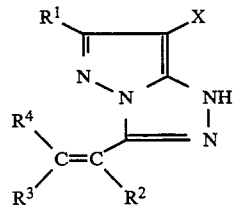

with
$R^1$ H or an optionally substituted alkyl group;
$R^2$, $R^3$, $R^4$ (identical or different) H, Cl, —COOH or optionally substituted alkyl groups; and
X H or a group releaseable by coupling provide, during chromogenic development: magenta dye images with high dye yield and advantageous absorption level.

19 Claims, No Drawings

POLYMERIC MAGENTA COUPLER AND COLOR PHOTOGRAPHIC RECORDING MATERIAL THAT CONTAINS THIS POLYMERIC MAGENTA COUPLER

Polymeric magenta coupler and colour-photographic recording material that contains this polymeric magenta coupler The invention relates to a polymeric magenta coupler and a colour-photographic recording material that contains this polymeric magenta coupler. The polymeric magenta coupler is obtained by polymerization of ethylenically unsaturated monomers and has pyrazoloazole groups that are linked directly with the ethylenically unsaturated group or the polymeric skeleton formed therefrom.

It is known to produce coloured photographic images by chromogenic development, that is by developing imagewise exposed silver halide emulsion layers in presence of suitable colour couplers by means of suitable colour-forming developer substances - so-called colour developers - wherein the oxidation product of the developer substances formed in correspondence with the silver image reacts with the colour coupler to form a dye image. Usually used as colour developers are compounds containing aromatic primary amino groups, especially those of the p-phenylenediamine type.

It is known to use the colour couplers in the form of polymer dispersions in which the functional group of a colour coupler is singly or multiply linked with a polymeric skeleton and in this way is made diffusion-proof. Such a polymer therefore has repeating structural units with the colour coupler.

Colour couplers that are incorporated in the form of such polymer dispersions in the layers of photographic recording materials are in general sufficiently diffusion-proof and cause little impairment of the mechanical properties of the layers, even at low binder contents. It is particularly important that they do not crystallize out during storage and have a good stability to light, heat and moisture and that the dyes produced therefrom also are stable, have the desired spectral properties and during development are diffusion-proof and deposited with the finest possible grain. Colour couplers that are incorporated in the form of such polymer dispersions with a molecular weight exceeding 5000 in photographic recording materials generally have good colloidal stability and meet some of the mentioned requirements directed to them really well. Such high-molecular color couplers are described for example in DE-C-1 297 417, DE-A-24 07 569, DE-A-31 48 125, DE-A-32 17 200, DE-A-33 20 079, DE-A-33 24 932, DE-A-33 31 743, DE-A-33 40 376, EP-A-27 284, U.S. Pat. No.4,080,211, U.S. Pat. No.4,559,297, U.S. Pat. No.4,681,835, DP 325 276 and DE-A-36 08 744.

The high-molecular colour couplers are generally produced by polymerization of ethylenically unsaturated so-called monomeric colour couplers.

However, the known polymeric magenta couplers have the following disadvantages:

The magenta dyes obtained from polymeric pyrazolone couplers have an absorption that is not ideal: the yellow secondary density, which necessitates the additional use of masking couplers, is particularly troublesome.

Polymeric pyrazoloazole couplers, as e.g. the compounds M-23 to M-27 of DE-A-35 16 996 or compound XV of EP-A-0 133 262, provide a completely inadequate dye yield and for this reason are unusable.

The present invention is based on the problem of making available improved polymeric magenta couplers for colour-photographic recording materials.

New polymeric magenta couplers have now been discovered. The new couplers are homo- or copolymers that contain repeating units of a coupler-containing polymerized monomer K and optionally repeating units, differing therefrom, of at least one further polymerizable monomer (comonomer).

The subject matter of the present invention is a polymeric colour coupler obtained by polymerization of ethylenically unsaturated coupler-containing monomers, characterized by repeating units of a polymerized monomer K of formula I

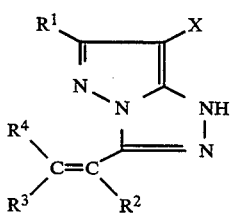

wherein $R^1$ represents H or an optionally substituted alkyl group;

$R^2$, $R^3$, $R^4$ (identical or different) represent H Cl, —COOH or optionally substituted alkyl groups; and X represents H or a group releasable by coupling.

The alkyl group represented by $R^1$ is preferably alkyl with 1-6 C atoms, e.g. methyl, ethyl, propyl, isopropyl, butyl, sec-butyl, tert-butyl, isobutyl, tert-amyl or hexyl; and the alkyl groups can be substituted, e.g. by Cl, —OH, —COOH, acylamido or sulphonamido.

The alkyl groups represented by $R^2$, $R^3$ or $R^4$ are preferably alkyl with 1-3 C atoms, especially methyl; the alkyl groups can be substituted, e.g. by Cl or —COOH.

The releaseable group represented by X can for example be a halogen atom, e.g. Cl, or an organic group, which is usually linked by way of an oxygen, sulphur or nitrogen atom to the coupling position of the coupler molecule. If the clearable group is a cyclic group, the linkage to the coupling position of the coupler molecule can be completed either directly via an atom that is part of a ring, e.g. a nitrogen atom, or indirectly via an interposed connecting link. Large numbers of such cleavable groups are known, e.g. as leaving groups of 2-equivalent magenta couplers.

Examples of clearable groups linked via oxygen correspond to the formula

wherein $R^5$ represents an acyclic or cyclic organic group, e.g. alkyl, aryl, a heterocyclic group or acyl, that is derived for example from an organic carboxylic or sulphonic acid. For particularly preferred cleavable groups of this kind, $R^5$ represents an optionally substituted phenyl group.

Examples of clearable groups linked via nitrogen are described for example in the following German Offenlegungsschriften (DE-A-):25 36 191, 27 03 589, 28 13 522, 33 39 201.

These are often 5-membered heterocyclic rings that are bonded via a ring nitrogen atom with the coupling point of the magenta coupler. The heterocyclic rings often contain adjacent to this the bond to the groups activating the nitrogen atom mediating the coupler molecule, e.g. carbonyl or sulphonyl groups or double bonds.

If the cleavable group is bonded via a sulphur atom to the coupling position of the coupler, it can be the radical of a diffusible mercapto compound, that is able to inhibit the development of silver halide. Such inhibitor radicals have often been described as a clearable group bonded at the coupling positions of couplers, even magenta couplers, e.g. in U.S. Pat. No. 3,227,554.

Examples of suitable coupler-containing monomers K are given below:

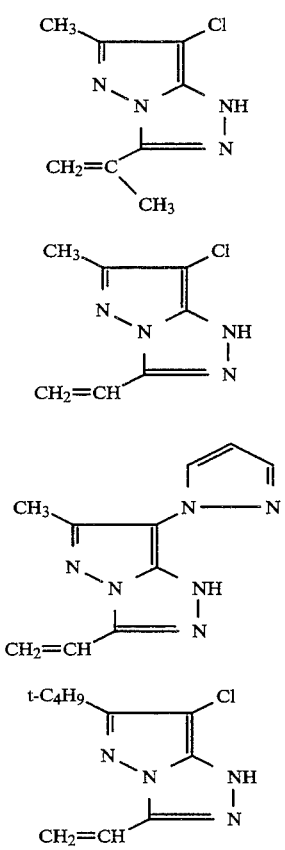

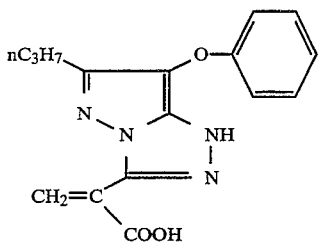

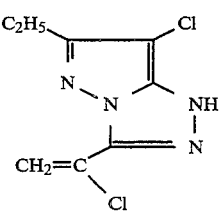

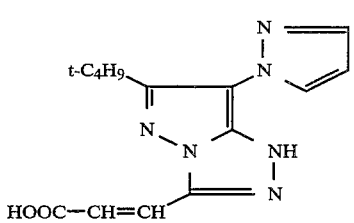

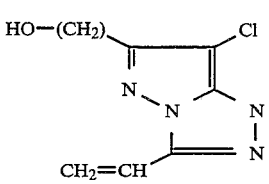

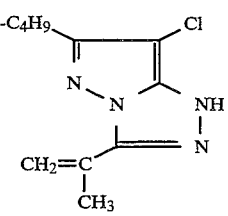

The synthesis of the coupler-containing monomers is illustrated, taking K-2 as an example:

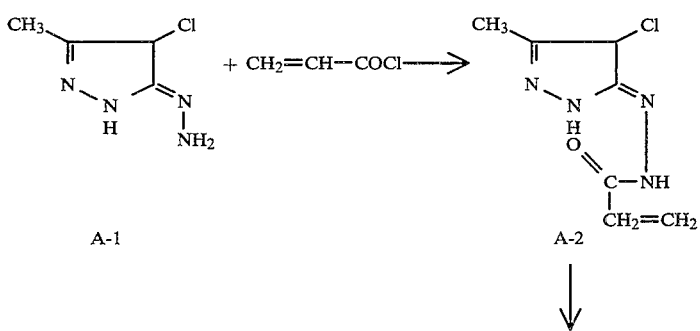

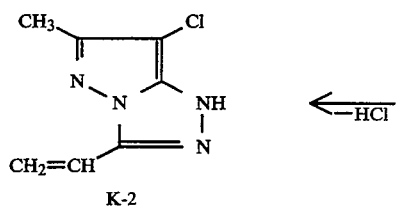

K-2

⇐ −HCl

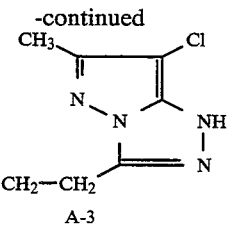

-continued

A-3

SYNTHESIS OF THE COMPOUND K-2

Acylation of the Hydrazinopyrazole A-1

372.6 g of 74.7% acidified hydrazinopyrazole are introduced to 2 l of cold water at 0° C. Then the solution is neutralized over 10 minutes with 463.8 g 20% aqueous sodium hydroxide solution. Then 140 g sodium hydrogen carbonate and 350 ml acetonitrile are added, and subsequently 107.9 g acryloyl chloride in 350 ml acetonitrile are charged over 15 minutes at 0° C. After 15 minutes subsequent stirring at 0° C., the mixture is filtered with suction, and the solid stirred twice with 0.8 l of water and filtered off with suction. 222 g of product A-2 is obtained.

Cyclization to A-3

252 ml phosphoryl chloride are charged over 15 min to a solution of 182 g A-2 in 1.83 l diethylene glycol dimethyl ether. Subsequently the mixture is heated to 80° C. and stirred for a further 5 h at this temperature. After cooling to 50° C., the reaction mixture is added dropwise in 40 minutes to 7.3 l of warm water at 65° C. The mixture is stirred for a further 15 min, then cooled to 0° C. and filtered by suction. The crude product is twice stirred with 2 l water and then dried in vacuo at 40° C. 116 g of product A-3 is obtained.

Coupler Monomer K-2

293.3 g potassium tert-butylate are dissolved in 529 ml dimethyl sulphoxide. 115 g A-3 dissolved in 173 ml dimethyl sulphoxide are charged with careful cooling at 20°-25° C. After 15 minutes' further stirring, the reaction mixture is precipitated in a mixture of 4.14 kg ice with 230 g concentrated hydrochloric acid, filtered with suction, and the precipitate washed and dried in vacuo at 40° C. 94 g of product K-2 are obtained. mp 192° C.

The proportion of the coupler-containing monomer K in the copolymer is generally 10–100 wt %, preferably 20–80 wt %.

The copolymers according to the invention can contain, apart from the repeating units of coupler-containing monomer K, in addition repeating units of at least one further copolymerized monomer C (comonomer). Examples of such monomers C include esters and amides of acrylic acid and its derivatives, e.g. of acrylic acid, α-chloroacrylic acid, methacrylic acid (for example acrylamide, methyl methacrylate, ethyl acrylate, ethyl methacrylate, n-propyl acrylate, n-butyl acrylate, 2-ethylhexyl acrylate, n-hexyl acrylate, octyl methacrylate, lauryl methacrylate and methylenebis(acrylamide)), vinyl esters (for example vinyl acetate, vinyl propionate and vinyl laurate), acrylonitrile, methacrylonitrile, aromatic vinyl compounds (for example styrene, vinyltoluene, divinylbenzene, vinylacetophenone, styrenesulphonic acid), itaconic acid, citraconic acid, crotonic acid, vinylidene chloride, vinyl alkyl ethers (for example vinyl ethyl ether), esters of maleic acid, N-vinyl-2-pyrrolidone, N-vinyl-, 2-vinyl- and 4-vinylpyridine. Other possible comonomers for example are monomers with an acid group, as for example acrylic acid, methacrylic acid, itaconic acid, maleic acid, fumaric acid, styrenesulphonic acid, acrylamido-2-methylpropanesulphonic acid, sulphoethyl methacrylate and vinylsulphonic acid. The total proportion of the further monomers C in the polymeric colour coupler can be 0–90 wt %, preferably 20–80 wt %.

It is particularly preferred to use as monomer C an ester of acrylic acid or methacrylic acid and/or a polymerizable acid. Two or more of the above-described monomers C can be used together. For example it is possible to use a combination of n-butyl acrylate and divinylbenzene, styrene and methyl methacrylate, or methyl acrylate and butyl methacrylate. The ethylenically unsaturated monomer C can be so chosen that it has an advantageous effect on the physical and/or chemical properties of the copolymer to be produced, for example on the solubility, compatibility with a binder such as gelatine or other photographic additives such as colouring compounds, agents absorbing ultraviolet radiation, antioxidants and the like, as well as on the flexibility of the layer combinations or, that is to say, of the colour-photographic recording material. Although the monomers C generally do not contain groups that display photographic activity, it is possible to use as monomer C also such compounds as contain, apart from the ethylenically unsaturated polymerizable group a photographically active group, e.g. a group capable of coupling, that, however, is different from the coupler group shown in formula I. Such groups capable of coupling can have for example white-coupler or masking-coupler properties, or on coupling can release a photographically active group, e.g. an inhibitor or development accelerator.

The molecular weights of the polymers according to the invention exceed 1000, preferably exceed 5000 and in particular exceed 20,000. The upper limit is not critical and, if bi- or polyfunctional monomers are used as the additional monomer C, can reach values exceeding 10 million.

The polymeric magenta couplers according to the invention are usually added to the photographic recording materials in the form of polymer dispersions, e.g. as polymer latex.

The polymerization of the monomer mixture (monomer K, monomer S and optionally monomer C) can be carried out according to one of the usual polymerization processes, e.g. by emulsion polymerization or by polymerization in an organic solvent.

The polymerization of the ethylenically unsaturated monomers is generally initiated by free radicals, which are formed by thermal decomposition of a chemical initiator, by the action of a reducing agent on an oxidizing compound (redox initiator) or by physical action, such as irradiation with ultraviolet radiation or other high-energy radiation, high frequencies etc.

Examples of chemical initiators include a persulphate (for example ammonium persulphate or potassium persulphate etc.), a peroxide (for example hydrogen peroxide, benzoyl peroxide or tert-butyl peroctoate and an azonitrile compound (for example 4,4'-azo-bis(4-cyanovaleric acid) or azobis(isobutyronitrile)).

Examples of conventional redox initiators include hydrogen peroxide/iron(II) salt, potassium persulphate, sodium metabisulphite and Ce(IV) salt/alcohol.

Examples of the initiators and their functions are described by F. A. Bovey in Emulsion Polymerization, Interscience Publishers Inc., New York, 1955, pages 59 to 93.

A compound with surfactant effect is used as the emulsifier which can be used during the emulsion polymerization. Preferred examples thereof include soaps, sulphonates, sulphates, cationic compounds, amphoteric compounds and high-molecular protective colloids. Specific examples of the emulsifiers and their functions are described in Belgische Chemische Industrie vol. 28, pages 16 to 20, 1963.

An organic solvent optionally used during the production of the polymer or during the dispersion of the polymer in an aqueous gelatine solution can be removed from the casting solution before casting.

Possible solvents are for example those that have a certain degree of water solubility, so that they can easily be removed from gelatine noodles by washing with water, and those that can be removed by spray drying or by scavenging with vacuum or steam.

Examples of such solvents include esters (for example ethyl acetate), ethers, ketones, halogenated hydrocarbons (for example methylene chloride and trichloroethylene), alcohols (for example methanol, ethanol and butanol) and combinations thereof.

In order to improve the dispersion stability and the flexibility of the layered emulsion, a small amount (preferably not more than 50%, relative to the polymeric couplers according to the invention) of a permanent solvent, particularly a water-immiscible high-boiling organic solvent, for example dibutyl phthalate and/or tricresyl phosphate, can be added. The concentration of the permanent solvent must be sufficient to plasticize the polymer, while it is held in the state of a solid particle. On the other hand the concentration of the permanent solvent must be as low as possible in the interest of a low layer thickness and layer load.

In the following, descriptions are given of some representative examples of synthesis of the polymeric magenta couplers according to the invention.

Polymer Coupler P-1

Copolymer Coupler from Pyrazolotriazole Monomer K-2, Butyl Acrylate and Methacrylic Acid While nitrogen is passed, 38.5 g butyl acrylate, 10.64 g methacrylic acid and 21 g of coupler monomer K2 are stirred in 51.1 ml tert-butanol at 60° C. for 30 min. Then the mixture is warmed to 88° C. and two-thirds of a solution of 1.58 g azodiisobutyric acid dimethyl ester in 25.2 g tert-butanol are added. The mixture is stirred for 1 h at 88° C., the remaining starter solution is added and stirring continued for a further 2 h. Subsequently the mixture is reinitiated with the same amount of starter dissolved in 9.35 g tert-butanol, and stirred for 3 h at 88° C. After cooling to room temperature, the mixture is diluted with 360 ml acetone and precipitated with 3.6 l ice/water. After filtering off under suction and drying, 51 g of polymer P-1 are obtained.

Polymer Coupler P-2

Copolymer of Pyrazolotriazole Monomer K4, Methacrylic Acid and Butyl Acrylate

While nitrogen is passed, 4 g butyl acrylate, 2 g methacrylic acid and 4 g coupler monomer K-4 are stirred in 7.3 ml tert-butanol at 60° C. for 30 min. Then the mixture is heated to 88° C. and two-thirds of a solution of 0.225 g azodiisobutyric acid dimethyl ester in 3.5 g tert-butanol is added. The mixture is stirred for 1 h at 88° C., the remaining starter solution is added and the mixture stirred for a further 2 h. Subsequently the mixture is reinitiated with the same amount of starter dissolved in 3.5 g tert-butanol and stirred for 3 h at 88° C., the same amount is added once more and stirring continued for a further 7 h. After cooling to room temperature, the mixture is diluted with 50 ml acetone and precipitated in 500 g ice/water. After filtering off under suction and drying, 6.3 g polymer P-2 are obtained.

Polymer Couplers P-3 to P-10

Using the above-described coupler-containing monomer K, the polymer couplers described in the following Table 1 are prepared in the same way as described for the copolymers in the above examples.

The following abbreviations are used for the comonomers C:
BA butyl acrylate
EA ethyl acrylate
MA methyl acrylate
BM butyl methacrylate
AS acrylic acid
MAS methacrylic acid Also indicated in Table 1 are the reference couplers A and B, in which the pyrazolotriazole skeleton is linked with the polymer chain by via a connecting link.

TABLE 1

| Polymer-coupler (P—) | Monomer K | wt % | Comonomer $C_1$ | wt % | Comonomer $C_2$ | wt % |
|---|---|---|---|---|---|---|
| 3 | K-2 | 30 | BA | 55 | AS | 15 |
| 4 | K-2 | 40 | EA | 40 | MAS | 20 |
| 5 | K-4 | 40 | BA | 20 | AS | 40 |
| 6 | K-4 | 45 | BM | 10 | AS | 45 |
| 7 | K-1 | 30 | BA | 45 | MAS | 25 |
| 8 | K-2 | 35 | BM | 47 | MAS | 18 |
| 9 | K-2 | 35 | MA | 52 | AS | 13 |
| 10 | K-4 | 50 | — | — | MAS | 50 |

The colour-photographic recording material according to the invention contains at least one light-sensitive silver halide emulsion layer and preferably a succession of several such light-sensitive silver halide emulsion layers and, optionally arranged between them, nonlight-sensitive binder layers, wherein a polymeric magenta coupler of the present invention is allocated to at least one of the light-sensitive silver halide emulsion layers present.

The light-sensitive silver halide emulsions used in the light-sensitive layers can contain, as the halide, chloride, bromide or iodide or mixtures thereof. For example the halide content of at least one layer can consist of 0 to 12 mol % iodide, 0 to 50 mol % chloride and 50 to 100 mol % bromide. In certain specific embodiments, these are largely compact crystals that are e.g. cubic or octahedral or have intermediate forms. They can be characterized in that they have in the main a thickness of more than 0.2 µm. The average ratio of diameter to thickness is preferably less than 8:1, wherein the diameter of a grain is defined as the diameter of a circle with an area corresponding to the projected area of the grain. In other specific embodiments, however, all or individual emulsions can also have essentially laminar silver halide crystals, in which the ratio of diameter to thickness exceeds 8:1. The emulsions can be heterodisperse or also monodisperse emulsions, which preferably have an average grain size of 0.3 µm to 1.2 µm. The silver halide grains can also have a layered grain structure.

The emulsions can be chemically and/or spectrally sensitized in the usual way; they can also be stabilized by suitable additives. Suitable chemical stabilizers, spectral sensitizing dyes and stabilizers are described for example in Research Disclosure 17,643; reference is made in particular to Chapters III, IV and VI.

The colour-photographic recording material according to the invention preferably contains at least one silver halide emulsion layer for the recording of light of each of the three spectral regions red, green and blue. For this purpose the light-sensitive layers are spectrally sensitized in known manner by suitable sensitizing dyes. Blue-sensitive silver halide emulsion layers do not need to have a spectral sensitizer, since the inherent sensitivity of the silver halide is in many cases sufficient for the recording of blue light.

Each of the light-sensitive layers mentioned can consist of a single layer or, in known manner, e.g. in the case of the so-called double-layer arrangement, also comprise two or more silver halide emulsion component layers-(DE-C-1 121 470). Usually red-sensitive silver halide emulsion layers are arranged closer to the film base than are green-sensitive silver halide emulsion layers and these in turn closer than the blue-sensitive, there being in general a non-light-sensitive yellow filter layer between green-sensitive layers and blue-sensitive layers. Other arrangements are, however, possible. Between layers different spectral sensitivity, a non-light-sensitive intermediate layer is generally arranged, which can contain means for preventing undesired diffusion of developer oxidation products. If several silver halide emulsion layers of the same spectral sensitivity are present, these can be arranged immediately adjacent to each other or in such a way that between them there is a light-sensitive layer with another spectral sensitivity (DE-A-1 958 709, DE-A-2 530 645, DE-A-2 622 922).

Colour-photographic recording materials according to the invention usually contain, in spatial and spectral coordination with the silver halide emulsion layers of differing spectral sensitivity, colour couplers for the production of the different component colour impages cyan, magenta and yellow, the polymeric couplers of the present invention being Generally allocated to a green-sensitive silver halide emulsion layer.

Spatial coordination must be understood to mean that the colour coupler is in such a spatial relationship to the silver halide emulsion layer that an interaction between them is possible that permits an imagewise correspondence between the silver image formed during the development and the colour image produced from the colour coupler. This is Generally achieved by the colour coupler being contained in the silver halide emulsion layer itself or in an optionally non-light-sensitive binder layer adjacent thereto.

Spectral coordination must be understood to mean that the spectral sensitivity of each of the light-sensitive silver halide emulsion layers and the colour of the component colour image produced from the colour coupler that in each case is spatially coordinated are in a Particular mutual relation, wherein each of the spectral sensitivities (red, green, blue) is allocated to another colour of the component colour image concerned (generally e.g. to the colours cyan, magenta or yellow in this order).

To each of the differently spectrally sensitized silver halide emulsion layers one or more colour couplers can be allocated. If several silver halide emulsion layers of the same spectral sensitivity are present, each of them can contain a colour coupler, and these colour couplers do not need to be identical. They must merely during colour development yield approximately the same colour, normally a colour that is complementary to the colour of the light to which the silver halide emulsion layers concerned are predominantly sensitive.

Consequently, in preferred embodiments, to red-sensitive silver halide emulsion layers there is allocated at least one non-diffusing colour coupler for production of the cyan component colour image, usually a coupler of the phenol or α-naphthol type. To green-sensitive silver halide emulsion layers there is allocated at least one non-diffusing colour coupler for the production of the magenta component colour image, in which case, in addition to the polymeric magenta couplers according to the invention, monomeric (low-molecular) magenta couplers of the 5-pyrazolone, indazolone, or pyrazoloazole types are optionally used. Finally, to blue-sensitive silver halide emulsion layers there is allocated at least one non-diffusing colour coupler for the production of the yellow component colour image, usually a colour coupler with an open-chain ketomethylene grouping. Colour couplers of this kind are known in large numbers and described in numerous patent specifications. Reference may be made here by way of example to the publications "Farbkuppler" (colour couplers) by W. Pelz in "Mitteilungen aus den Forschungslaboratorien der Agfa, Leverkusen/München", Vol. III, page 111 (1961) and by K. Venkataraman in "The Chemistry of Synthetic Dyes", Vol. 4, 31–387, Academic Press (1971).

The Colour couplers according to the invention, like the other colour couplers present in the colour-photographic recording material, can be conventional 4-equivalent couplers of 2-equivalent couplers, in which case a smaller amount of silver halide is necessary for dye production. 2-equivalent couplers: as is well known, are derived from the 4-equivalent couplers by containing in the coupling position a substituent which is split off during the coupling. The 2-equivalent couplers include both those that are practically colourless and those that have an intense intrinsic colour, that disappears during colour coupling or is replaced by the colour of the image dye produced. The latter couplers can also be additionally present in the light-sensitive silver halide emulsion layers and there serve as masking couplers for compensation of the undesired secondary densities of the image dyes. But the 2-equivalent couplers also include the well-known white couplers which, however, do not yield a dye during reaction with colour developer oxidation products. The 2-equivalent couplers also include those couplers that contain in the coupling position a clearable group which is released on reaction with colour developer oxidation products and at the same time exerts a particular desired photographic activity, e.g. as development inhibitor or accelerator. Examples of such 2-equivalent couplers are the well-known DIR couplers as well as PAR and FAR couplers. The clearable group can also be an inert group, so that during the reaction with colour developer oxidation products coupling products, e.g. dyes, can be obtained that are diffusible or at least have slight or restricted mobility.

A slight or restricted mobility must be understood to mean a mobility of such a magnitude that the outlines of the discrete spots of dye formed during the colour development run and are fused together. This degree of mobility must be distinguished on the one hand from the usual case of complete immobility in photographic layers, which is aimed at in the conventional photographic recording materials for the colour couplers or the dyes produced therefrom in order to obtain the greatest possible sharpness, and on the other hand from the case of complete mobility of the dyes that is aimed at for example in dye diffusion processes. The last-named dyes usually have at least one group that solubilizes them in the alkaline medium. The degrees of the slight mobility aimed at according to the invention can be controlled by variation of substituents in order for example to influence in a specific way the solubility of the oil former in the organic medium or the affinity for the binder matrix.

For the recording materials according to the invention, the usual film bases are suitable, e.g. supports of cellulose esters, e.g. cellulose acetate, and of polyesters. Also suitable are paper supports, which can optionally be coated, e.g. with polyolefins, particularly with polyethylene or polypropylene. Reference is made in this connection to the aforementioned Research Disclosure 17,643, Chapter XVII.

As protective colloid or binder for the layers of the recording material, the usual hydrophilic film-forming agents are suitable, e.g. proteins, especially gelatine. Casting aids and plasticizers can be used. Reference is made to chapters IX, XI and XII in the aforementioned Research Disclosure 17,643.

The layers of the photographic material can be hardened in the usual way, for example with hardeners that contain at least two reactive oxirane, aziridine or acryloyl groups. Beyond that it is also possible to harden the layers in accordance with the process described in DE-A-22 18 009. It is furthermore possible to harden the photographic layers or the colour-photographic multilayer materials with hardeners of the diazine-triazine or 1,2-dihydroquinoline series, or with hardeners of the vinylsulphone type. Further suitable hardeners are known from DE-A-24 39 551, DE-A-22 25 230 and DE-A-22 17 672, as well as from Research Disclosure 17,643, Chapter X.

The photographic material can moreover contain other additives, e.g. UV-light-absorbing compounds, optical brightener agents, spreaders, filter dyes, formalin scavengers, light stabilizers, antioxidants, $D_{min}$ dyes, additives for improving the stabilization of dyes, couplers and whites as well as for reducing the chemical fog, plasticizers (latices), biocides and others.

Additives for improving the stability of dye and coupler and the whites as well as for reducing the chemical fog (Research Disclosure 17,643 (December 1978), Chapter VII) can belong to the following classes of chemical substances: hydroquinones, 6-hydroxychromans, 5-hydroxycoumarans, spirochromans, spiroindans, p-alkoxyphenols, sterically hindered phenols, gallic acid derivatives, methylenedioxybenzenes, aminophenols, sterically hindered amines, derivatives with esterified or etherified phenolic hydroxyl groups and metal complexes.

Suitable colour developer substances for the material according to the invention are in particular those of the p-phenylenediamine type, e.g. 4-amino-N,N-diethylaniline hydrochloride, 4-amino-3-methyl-N-ethyl-N-$\beta$-(methanesulphonamido)ethylaniline sulphate hydrate, 4-amino-3-methyl-N-ethyl-N-$\beta$-hydroxyethylaniline sulphate, 4-amino-N-ethyl-N-(2-methoxyethyl)-m-toluidine-di-p-toluenesulphonic acid and N-ethyl-N-$\beta$-hydroxyethyl-p-phenylenediamine. Other useful colour developers are described for example in J. Amer. Chem. Soc. 73, 3100 (1951) and in G. Haist, Modern Photographic Processing, 1979, John Wiley and Sons, New York, pages 545 ff.

After the colour development: the material is usually bleached and fixed. Bleaching and fixing can be carried out separately from each other or together. The usual compounds can be used as bleaching agents, e.g. $Fe^{3+}$ salts and $Fe^{3+}$ complex salts, such as ferricyanides, dichromates, water-soluble cobalt complexes etc. Especially preferred compounds are iron(III) complexes of aminopolycarboxylic acids, especially e.g. ethylenediaminetetraacetic acid, nitrilotriacetic acid, iminodiacetic acid, N-hydroxyethylethylenediaminetriacetic acid, alkyliminodicarboxylic acids and of corresponding phosphonic acids, Moreover, persulphates are suitable as bleaching agents.

EXAMPLE 1

The polymer couplers according to the invention 1, 2, 3, 4, 5, 8, 10 and the polymeric reference couplers A and B were admixed with various samples of a silver halide emulsion that, according to the colour coupler introduced, was suitably sensitized for green. The silver halide-gelatine emulsion used consisted of 75 silver bromide iodide (iodide content 3 mol %) and 72 g gelatine relative to 1 kg emulsion.

The emulsions so prepared were applied to a cellulose triacetate film base provided with an adhesive layer and dried.

Photographic Testing

The individual samples were exposed by means of a sensitometer and subsequently processed by use of the following colour developer composition.

| Colour developer composition | |
|---|---|
| Distilled water | 800 g |
| Hydroxyethanediphosphonic acid, di-Na salt | 2 g |
| Ethylenediaminetetraacetic acid, di-Na salt | 2 g |
| Potassium carbonate | 34 g |
| Sodium hydrogen carbonate | 1.55 g |
| Sodium disulphite | 0.28 g |
| Sodium sulphite | 3.46 g |

-continued

| | |
|---|---|
| Potassium bromide | 1.34 g |
| Hydroxylamine sulphate | 2.4 g |
| N-ethyl-N-(β-hydroxy)ethyl-4-amino-3-ethylaniline sulphate | 4.7 g |
| Distilled water ad 1000 ml | |

| Processing | Processing [min] (25° C.) |
|---|---|
| Colour development | 10 |
| Stop bath | 4 |
| Intermediate rinsing | 5 |
| Bleaching bath | 5 |
| Intermediate rinsing | 5 |
| Fixing bath | 5 |
| Final rinsing | 10 |

The stop, bleaching and fixing baths are conventional bath compositions. A formalin-free final bath was used.

The absorption maximum $\lambda$max and the halfbandwidth of the absorption curve were determined (Table 2).

TABLE 2

| Polymer coupler | $\lambda$max, nm | HBW, nm |
|---|---|---|
| 1 | 550 | 87 |
| 2 | 552 | 85 |
| 3 | 550 | 88 |
| 4 | 551 | 85 |
| 5 | 553 | 84 |
| 8 | 550 | 84 |
| 10 | 553 | 86 |
| A (Reference) | 546 | 94 |
| B (Reference) | 547 | 95 | can be achieved. With the polymers according to the invention the half-band width of the absorption is smaller and the maximum is shifted to longer wavelengths.

Example 2

The polymeric couplers according to the invention 1, 2, 3, 4, 5, 8, 10 and the polymeric reference couplers A and B were used in the same way as described in Example 1 except that the polymeric couplers were emulsified in admixture with one of the high-boiling solvents S-1, S-2 and S-3. Production of the samples and their processing were as described in Example 1. The half-band width (HBW) of the absorption and the wavelengths of absorption maximum were determined as shown in Table 3.

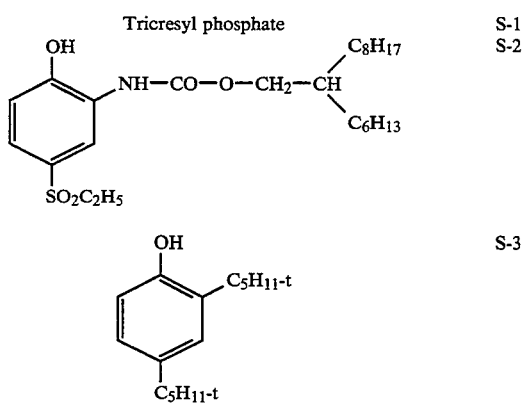

Polymer coupler A

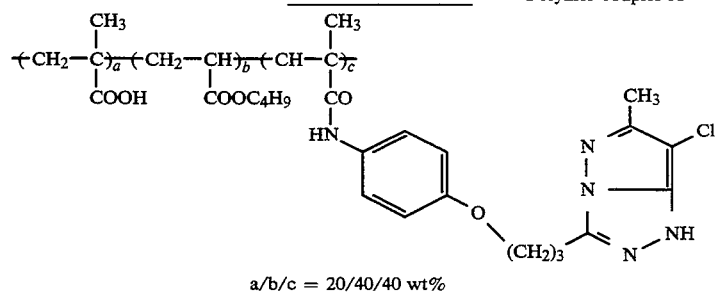

a/b/c = 20/40/40 wt%

Polymer coupler B

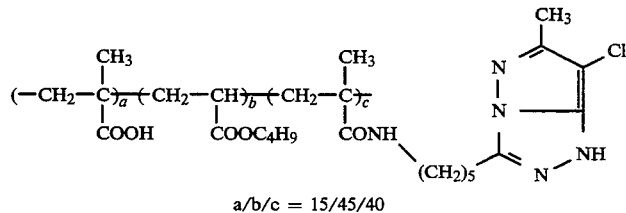

a/b/c = 15/45/40

From the results it is evident that with the polymers according to the invention an improved colour reproduction compared with the known polymer couplers

TABLE 3

| Sample | Polymeric coupler | high boiling solvent | Amount[1] | $\lambda_{max}$/nm | HBW/nm |
|---|---|---|---|---|---|
| 1 | 1 | S-1 | 30 | 550 | 85 |
| 2 | 2 | S-2 | 20 | 554 | 83 |
| 3 | 3 | S-1 | 25 | 551 | 82 |
| 4 | 4 | S-3 | 30 | 553 | 85 |
| 5 | 5 | S-1 | 50 | 550 | 86 |
| 6 | 8 | S-3 | 30 | 554 | 83 |
| 7 | 10 | S-3 | 20 | 553 | 84 |
| 8 | 5 | S-2 | 50 | 552 | 82 |

TABLE 3-continued

| Sample | Polymeric coupler | high boiling solvent | Amount[1] | $\lambda_{max}$/nm | HBW/nm |
|---|---|---|---|---|---|
| 9 | 5 | S-3 | 50 | 553 | 83 |
| 10 (Reference) | A | S-1 | 30 | 546 | 92 |
| 11 (Reference) | B | S-2 | 20 | 548 | 93 |

[1]Weight-%, based on amount of polymeric coupler

From Table 3 it can be seen that the dyes produced from the polymeric couplers have an advantageous absorption at longer wavelengths and narrow absorption curves.

What is claimed is:

1. A polymeric color coupler comprising repeating units of a monomer K of formula I

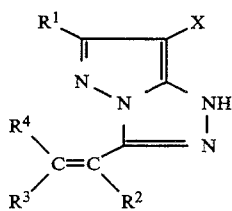

wherein
$R^1$ represents H, an unsubstituted alkyl group or a substituted alkyl group;
$R^2$, $R^3$, $R^4$ are identical or different and represent H, Cl —COOH, unsubstituted alkyl groups or substituted alkyl groups; and
X represents H or a group releaseable by coupling.

2. The polymeric color coupler of claim 1, wherein $R^1$ is an alkyl group or a substituted alkyl group containing 1-6 carbon atoms.

3. The polymeric color coupler of claim 1, wherein at least one of $R^2$, $R^3$ and $R^4$ is an unsubstituted alkyl group or a substituted alkyl group containing 1-3 carbon atoms.

4. The polymeric color coupler of claim 1, wherein $R^1$ is a substituted alkyl group and further wherein the substituents on $R^1$ are selected from the group consisting of Cl —OH, —COOH, acylamido and sulphonamido.

5. The polymeric color coupler of claim 1, wherein at least one of $R^2$, $R^3$ and $R^4$ is a substituted alkyl group and further wherein the substituents on the alkyl group are selected from the group consisting of Cl and —COOH.

6. The polymeric color coupler of claim 1, wherein X is selected from the group consisting of H, Cl and an organic group.

7. The polymeric color coupler of claim 6, wherein X is an organic group which is linked to the monomer K by an oxygen atom, a sulfur atom or a nitrogen atom.

8. The polymeric color coupler of claim 1, wherein the monomer K is

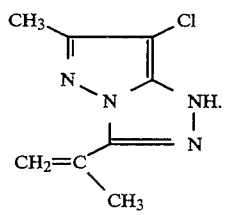

9. The polymeric color coupler of claim 1, wherein the monomer K is

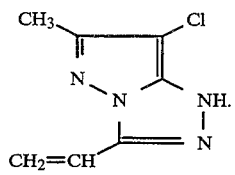

10. The polymeric color coupler of claim 1, wherein the monomer K is

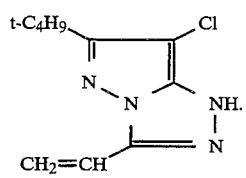

11. The polymeric color coupler of claim 1, wherein the monomer K is

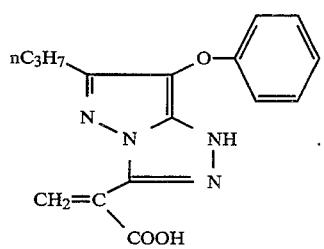

12. The polymeric color coupler of claim 1, wherein the monomer K is

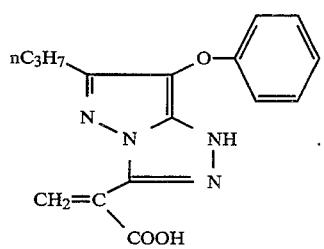

13. The polymeric color coupler of claim 1, wherein the monomer K is

14. The polymeric color coupler of claim 1, wherein the monomer K is

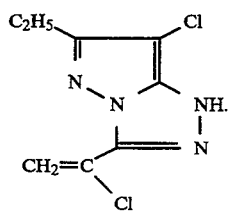

15. The polymeric color coupler of claim 1, wherein the monomer K is

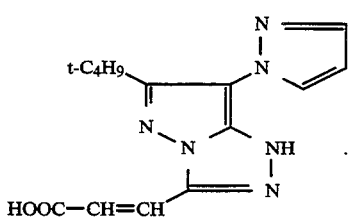

16. The polymeric color coupler of claim 1, wherein the monomer K is

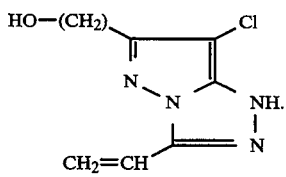

17. A polymeric color coupler comprising
a) repeating units of a monomer K of formula I

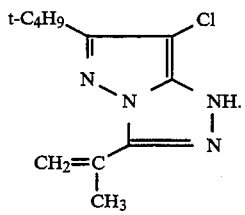

wherein
$R^1$ represents H, an alkyl group or a substituted alkyl group;

$R^2$, $R^3$, $R^4$ (identical or different) represent H, Cl —COOH, alkyl groups or substituted alkyl groups; and X represents H or a group releaseable by coupling; and b) at least one copolymerized monomer C (comonomer).

18. The polymeric color coupler of claim 17, wherein said copolymerized monomer C is selected from the group consisting of acrylic acid, methacrylic acid, itaconic acid, maleic acid, fumaric acid, styrenesulphonic acid, acrylamido-2methylpropanesulphonic acid, sulphoethyl methacrylate, vinyl sulphonic acid, esters of acrylic acid, esters of methacrylic acid, amides of acrylic acid and amides of methacrylic acid.

19. The polymeric color coupler of claim 17, wherein said copolymerized monomer C is selected from the group consisting of butyl acrylate, methacrylic acid, ethyl acrylate, methyl acrylate, butyl methacrylate and acrylic acid.

* * * * *

UNITED STATES PATENT AND TRADEMARK OFFICE
CERTIFICATE OF CORRECTION

PATENT NO. : 5,354,826
DATED : October 11, 1994
INVENTOR(S) : Günter Helling, et al It is certified that error appears in the above-indentified patent and that said Letters Patent is hereby corrected as shown below:

Column 15, line 31, "Cl-COOH," should read --Cl,-COOH,--.

Column 15, line 35, "$R^1$ is an alkyl group" should be --$R^1$ is an unsubstituted alkyl group--.

Column 15, line 44, "Cl-OH," should be --Cl,-OH,--.

Column 18, line 26, "H,Cl" should be --H,Cl,--.

Signed and Sealed this

Twenty-ninth Day of August, 1995

Attest:

BRUCE LEHMAN

*Attesting Officer*     *Commissioner of Patents and Trademarks*